US010306570B2

(12) United States Patent
Seo et al.

(10) Patent No.: US 10,306,570 B2
(45) Date of Patent: May 28, 2019

(54) METHOD FOR CONTROLLING TIMING ADVANCE FOR DIRECT COMMUNICATION BETWEEN TERMINALS IN WIRELESS COMMUNICATION SYSTEM, AND APPARATUS THEREFOR

(71) Applicant: LG ELECTRONICS INC., Seoul (KR)

(72) Inventors: Hanbyul Seo, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 15/317,720

(22) PCT Filed: Jun. 9, 2015

(86) PCT No.: PCT/KR2015/005762
§ 371 (c)(1),
(2) Date: Dec. 9, 2016

(87) PCT Pub. No.: WO2015/190795
PCT Pub. Date: Dec. 17, 2015

(65) Prior Publication Data
US 2017/0111876 A1 Apr. 20, 2017

Related U.S. Application Data

(60) Provisional application No. 62/010,437, filed on Jun. 10, 2014.

(51) Int. Cl.
*H04W 56/00* (2009.01)
*H04W 92/18* (2009.01)

(52) U.S. Cl.
CPC ....... *H04W 56/001* (2013.01); *H04W 56/002* (2013.01); *H04W 56/0005* (2013.01); *H04W 56/0045* (2013.01); *H04W 92/18* (2013.01)

(58) Field of Classification Search
CPC ............... H04W 56/001; H04W 92/18; H04W 56/0045; H04W 56/002; H04W 56/0005
See application file for complete search history.

(56) References Cited

U.S. PATENT DOCUMENTS 9,462,498 B2 * 10/2016 Lee ..................... H04W 24/10
9,742,546 B2 * 8/2017 Seo ..................... H04W 24/02
(Continued)

FOREIGN PATENT DOCUMENTS

CN 103024924 A 4/2013
CN 103108389 A 5/2013
(Continued)

OTHER PUBLICATIONS

"3rd Generation Partnership Project; Technical Specification Group Radio Access Network; Study on LTE Device to Device Proximity Services; Radio Aspects (Release 12)," 3GPP TR 36.843, V12.0.0, Mar. 2014, pp. 1-49.

*Primary Examiner* — Ivan O Latorre
(74) *Attorney, Agent, or Firm* — Birch, Stewart, Kolasch & Birch, LLP

(57) ABSTRACT

Disclosed is a method for transmitting a signal by a terminal via a device to device (D2D) link in a wireless communication system. Specifically, the method comprises: a step for receiving information on a timing advance (TA) value from a base station; a step for transmitting the TA value to a counterpart terminal via a first D2D control channel; and a step for transmitting a D2D data channel based on the first D2D control channel to the counterpart terminal by applying the TA, wherein the TA is not applied to the first D2D control channel. In particular, when the information on the updated TA value is received from the base station, it is desirable to transmit the D2D data channel based on the first D2D control channel to the counterpart terminal by applying the (Continued)

updated TA, but in the case of applying the updated TA, not to apply the information on the TA value included in the first D2D control channel.

6 Claims, 11 Drawing Sheets

(56) References Cited

U.S. PATENT DOCUMENTS

| | | | | |
|---|---|---|---|---|
| 9,876,625 | B2* | 1/2018 | Seo | H04L 5/0073 |
| 9,883,507 | B2* | 1/2018 | Thubert | H04W 28/04 |
| 9,913,285 | B2* | 3/2018 | Li | H04W 72/1263 |
| 9,918,181 | B2* | 3/2018 | Chae | H04W 56/001 |
| 2006/0166688 | A1* | 7/2006 | Sun | H04B 7/2681 |
| | | | | 455/502 |
| 2013/0272196 | A1* | 10/2013 | Li | H04W 72/044 |
| | | | | 370/328 |
| 2013/0324182 | A1* | 12/2013 | Deng | H04W 52/281 |
| | | | | 455/522 |
| 2014/0029586 | A1* | 1/2014 | Loehr | H04W 56/0005 |
| | | | | 370/336 |
| 2014/0321314 | A1* | 10/2014 | Fodor | H04W 72/085 |
| | | | | 370/252 |
| 2015/0057006 | A1* | 2/2015 | Gao | H04W 72/04 |
| | | | | 455/450 |
| 2015/0163037 | A1* | 6/2015 | Seo | H04L 5/0051 |
| | | | | 370/336 |
| 2015/0245375 | A1* | 8/2015 | Li | H04L 5/0051 |
| | | | | 370/329 |
| 2015/0327261 | A1* | 11/2015 | Thubert | H04W 40/22 |
| | | | | 370/336 |
| 2016/0028572 | A1* | 1/2016 | Suzuki | H04W 76/14 |
| | | | | 370/281 |
| 2016/0057718 | A1* | 2/2016 | Sorrentino | H04W 8/005 |
| | | | | 370/350 |
| 2016/0112977 | A1* | 4/2016 | Byun | H04W 56/0015 |
| | | | | 370/350 |
| 2016/0270010 | A1* | 9/2016 | Sorrentino | H04W 56/002 |
| 2017/0215160 | A1* | 7/2017 | Lohr | H04W 56/002 |
| 2017/0245167 | A1* | 8/2017 | Noh | H04W 24/10 |

FOREIGN PATENT DOCUMENTS

| | | |
|---|---|---|
| KR | 10-2008-0098649 A | 11/2008 |
| WO | WO 2012/077971 A2 | 6/2012 |
| WO | WO 2013/067686 A1 | 5/2013 |
| WO | WO-2013067686 A1 * 5/2013 | ............ H04W 72/04 |
| WO | WO 2013/162333 A1 | 10/2013 |

* cited by examiner

FIG. 2
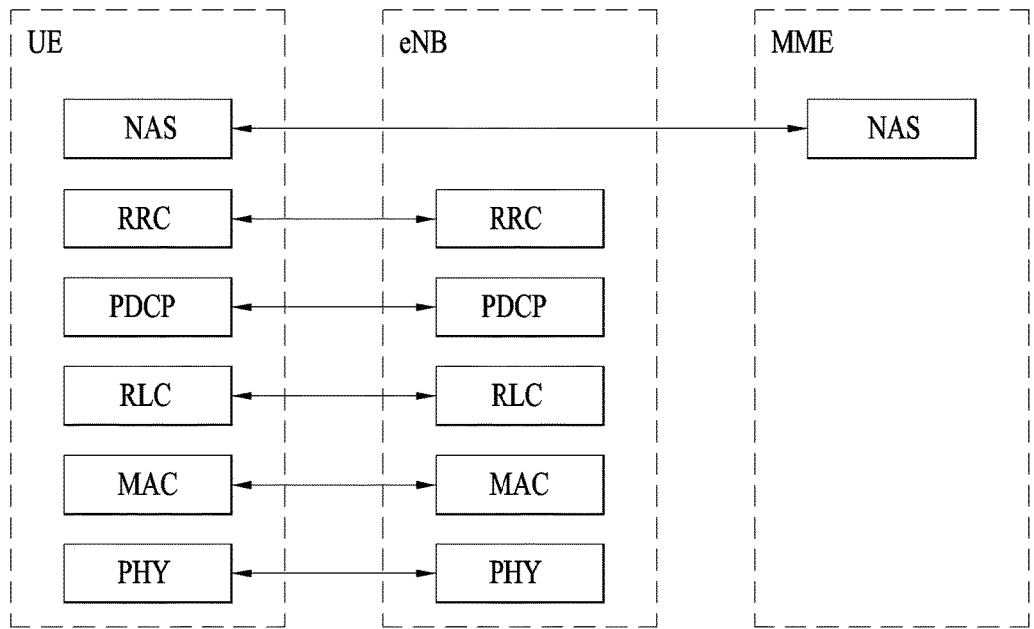
(A) CONTROL-PLANE PROTOCOL STACK
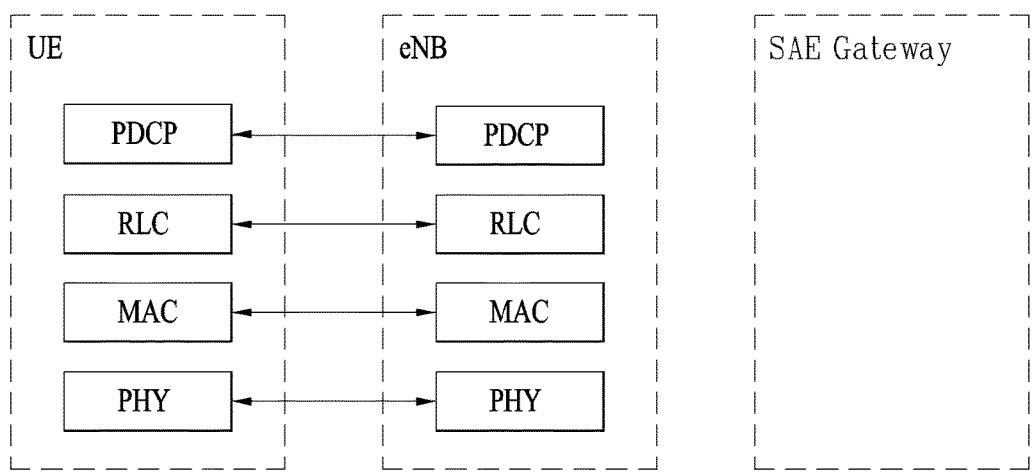
(B) USER-PLANE PROTOCOL STACK

METHOD FOR CONTROLLING TIMING ADVANCE FOR DIRECT COMMUNICATION BETWEEN TERMINALS IN WIRELESS COMMUNICATION SYSTEM, AND APPARATUS THEREFOR

CROSS REFERENCE TO RELATED APPLICATIONS:

This application is the National Phase of PCT International Application No. PCT/KR2015/005762, filed on Jun. 9, 2015, which claims priority under 35 U.S.C. 119(e) to U.S. Provisional Application No. 62/010,437, filed on Jun. 10, 2014, all of which are hereby expressly incorporated by reference into the present application.

TECHNICAL FIELD

The present invention relates to a wireless communication system, and more particularly, to a method and apparatus for controlling a Timing Advance (TA) for Device-to-Device (D2D) communication in a wireless communication system.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE

Technical Problem

An object of the present invention is to provide a method and apparatus for controlling a Timing Advance (TA) for Device-to-Device (D2D) communication in a wireless communication system.

Technical Solution

In one aspect of the present invention, a method for transmitting a signal via a Device-to-Device (D2D) link by a User Equipment (UE) in a wireless communication system includes receiving information about a Timing Advance (TA) value from a Base Station (BS), transmitting the TA value on a first D2D control channel to a correspondent UE, and transmitting a D2D data channel based on the first D2D control channel to the correspondent UE by applying the TA value to the D2D data channel. The TA value is not applied to the first D2D control channel.

Especially, the method may further include receiving information about an updated TA value from the BS, and transmitting the D2D data channel based on the first D2D control channel to the correspondent UE by applying the updated TA value to the D2D data channel. When the updated TA value is applied, the information about the TA value included in the first D2D control channel may not be applied.

The method may further include transmitting the information about the updated TA value on a second D2D control channel to the correspondence UE, and transmitting a D2D data channel based on the second D2D control channel to the correspondent UE by applying the updated TA value to the D2D data channel.

In another aspect of the present invention, a UE for conducting communication via a D2D link in a wireless communication system includes a wireless communication module for transmitting and receiving signals to and from another UE or a BS, and a processor for processing the signals. The processor controls the wireless communication module to transmit information about a TA value received from the BS to a correspondent UE on a first D2D control channel, and transmit a D2D data channel based on the first D2D control channel to the correspondent UE by applying the TA value to the D2D data channel. The TA value is not applied to the first D2D control channel.

Especially, upon receipt of information about an updated TA value from the BS, the processor may control the wireless communication module to transmit the D2D data channel based on the first D2D control channel to the correspondent UE by applying the updated TA value to the D2D data channel. When the processor applies the updated TA value, the processor may not apply the information about the TA value included in the first D2D control channel.

The processor may control the wireless communication module to transmit the information about the updated TA value on a second D2D control channel to the correspondence UE, and transmit a D2D data channel based on the second D2D control channel to the correspondent UE by applying the updated TA value to the D2D data channel.

In the above aspects, the updated TA value may be applied to an uplink signal directed to the BS along with the D2D data channel based on the first D2D control channel. Further, the D2D data channel based on the first D2D control channel may be transmitted on the assumption that the TA value is valid until before transmission of a second D2D control channel after the transmission of the first D2D control channel.

Advantageous Effects

According to the embodiments of the present invention, a Timing Advance (TA) for Device-to-Device (D2D) communication can be efficiently controlled.

The effects of the present invention are not limited to the above-described effects and other effects which are not described herein will be understood by those skilled in the art from the following description of the embodiments of the present invention.

BRIEF DESCRIPTION OF THE DRAWINGS

FIG. 2 illustrates the architecture of control-plane and user-plane radio interface protocols between a User Equipment (UE) and an Evolved UMTS Terrestrial Radio Access Network (E-UTAN), conforming to the $3^{rd}$ Generation Partnership Project (3GPP) radio access network standards.

BEST MODE

Figure 1:
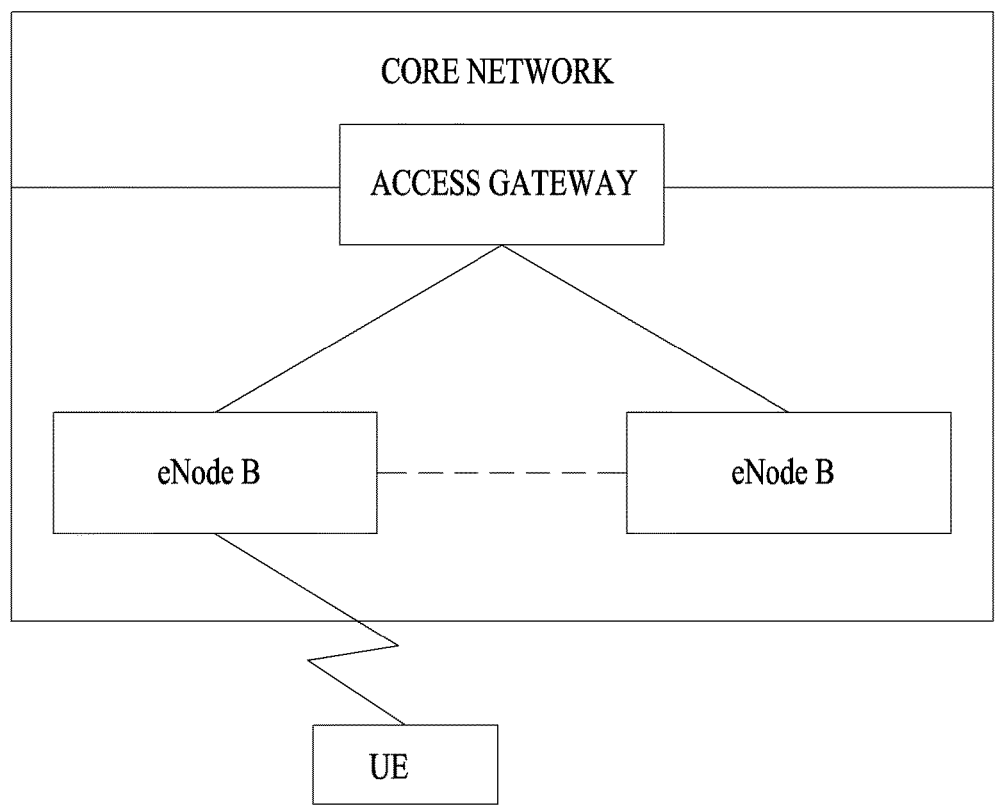
FIG. 1 illustrates a configuration of an Evolved Universal Mobile Telecommunications System (E-UMTS) network as an exemplary wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or Pv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
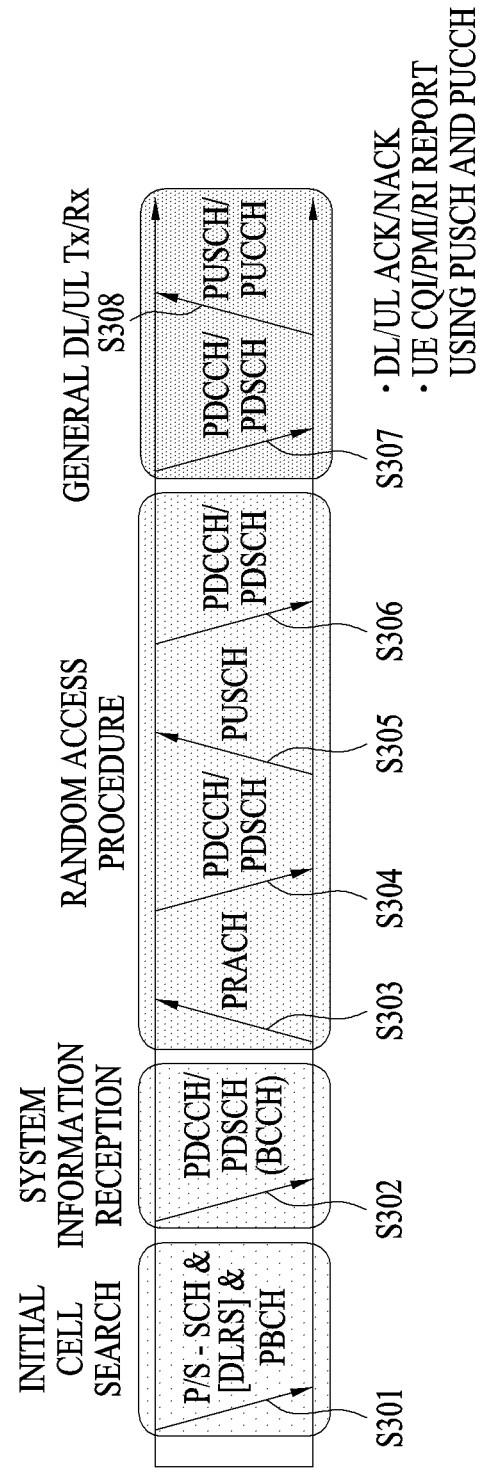
FIG. 3 illustrates physical channels used in a 3GPP Long Term Evolution (3GPP LTE) system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B. may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
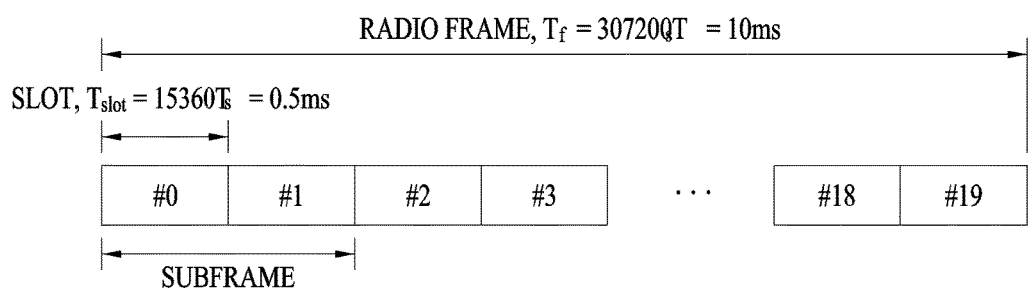
FIG. 4 illustrates a structure of a radio frame used in an LTE system.

FIG. 4 is a diagram for a structure of a radio frame in LTE system.

Referring to FIG. 4, one radio frame has a length of 10 ms (327,200×$T_s$) and is constructed with 10 subframes in equal size. Each of the subframes has a length of 1 ms and is constructed with two slots. Each of the slots has a length of 0.5 ms (15,360×$T_s$). In this case, $T_s$ indicates a sampling time and is represented as $T_s=1/(15 \text{ kHz}\times2048)=3.2552\times10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
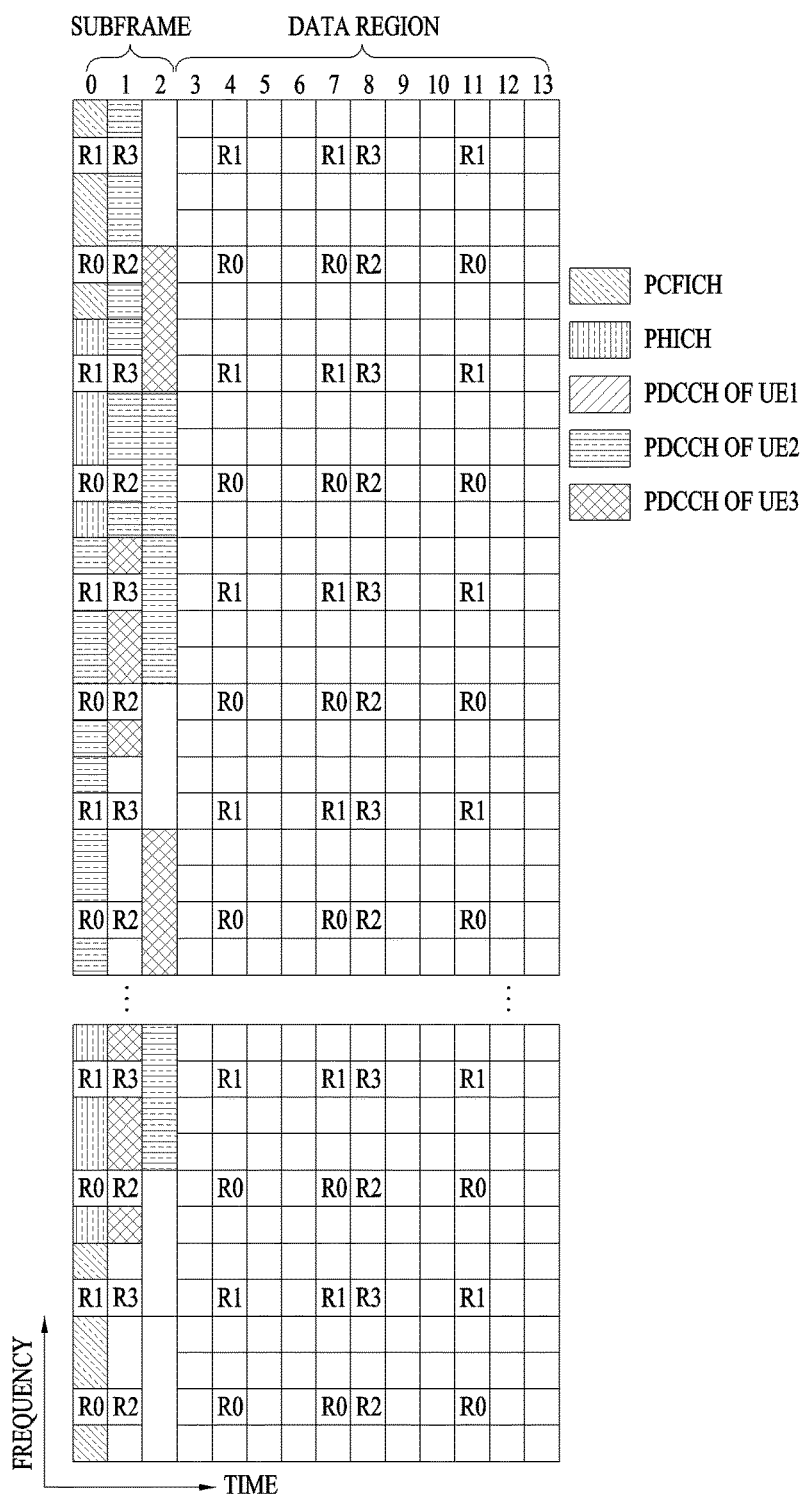
FIG. 5 an exemplary structure of a Downlink (DL) subframe in an LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
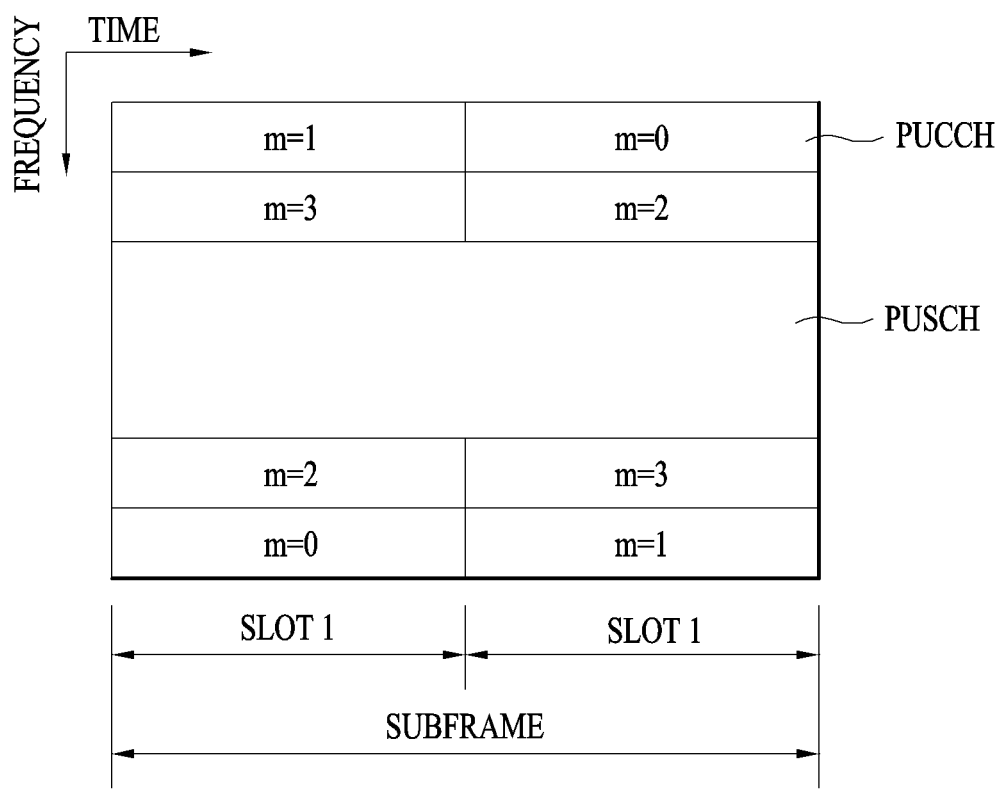
FIG. 6 illustrates a structure of an Uplink (UL) subframe in an LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

Now, a description will be given of a Timing Advance (TA) procedure in LTE and LTE-A systems.

In order to maintain UL orthogonality between different UEs, UL communication and DL communication are aligned along the time axis with respect to an eNB in the LTE system. The time-axis alignment between UL signals is the most basic method of avoiding interference between UEs within a cell.

To directly align UL transmissions along the time axis, TAs are used for UE transmissions. The UEs configure a reference TA value based on a DL reception timing, and eventually, the TA of each UE is determined based on the propagation delay of the UE.

Figure 7:
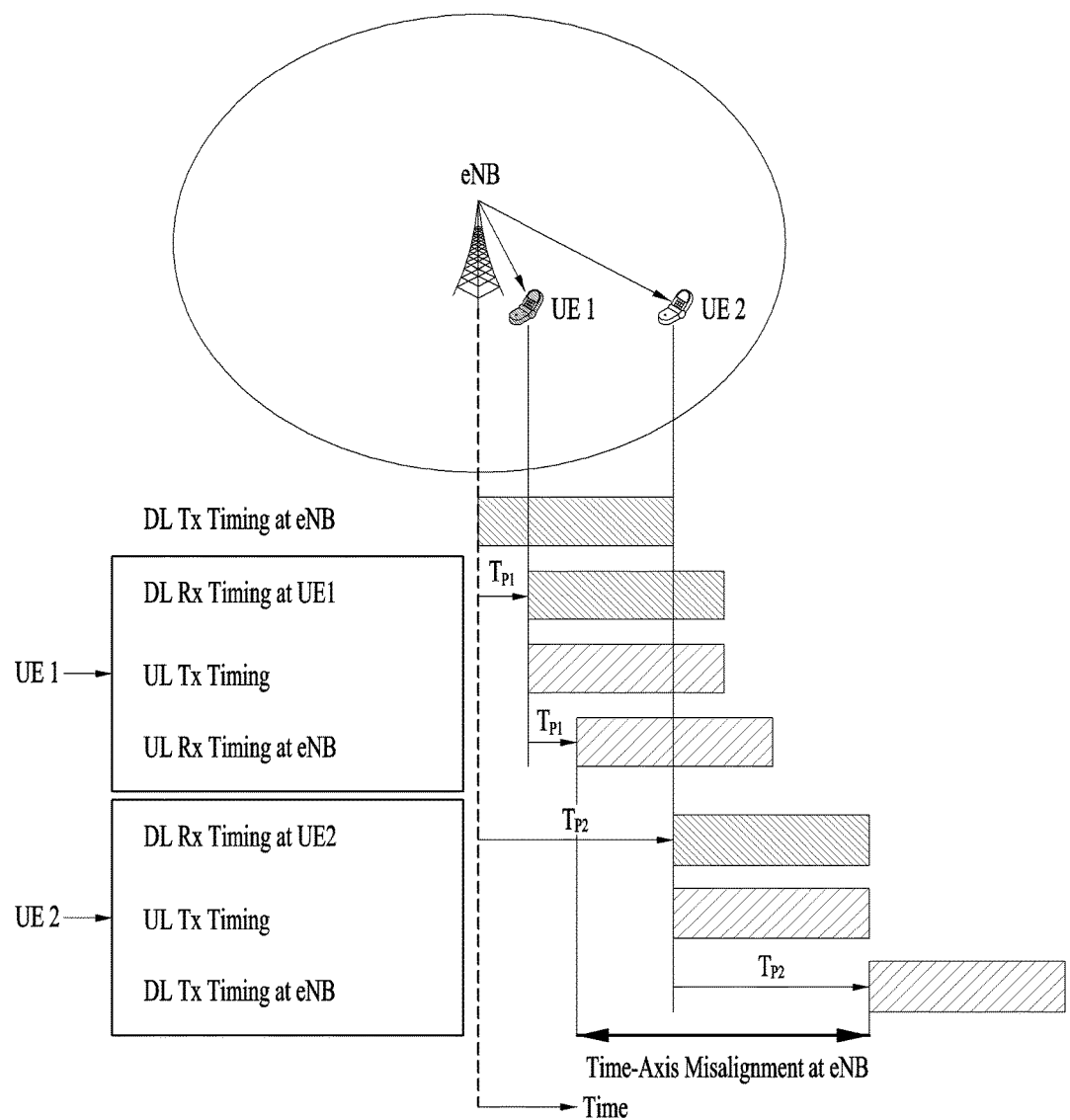
FIGS. 7 and 8 illustrate exemplary time-axis alignment between UL transmissions with Timing Advances (TAs).
Figure 8:
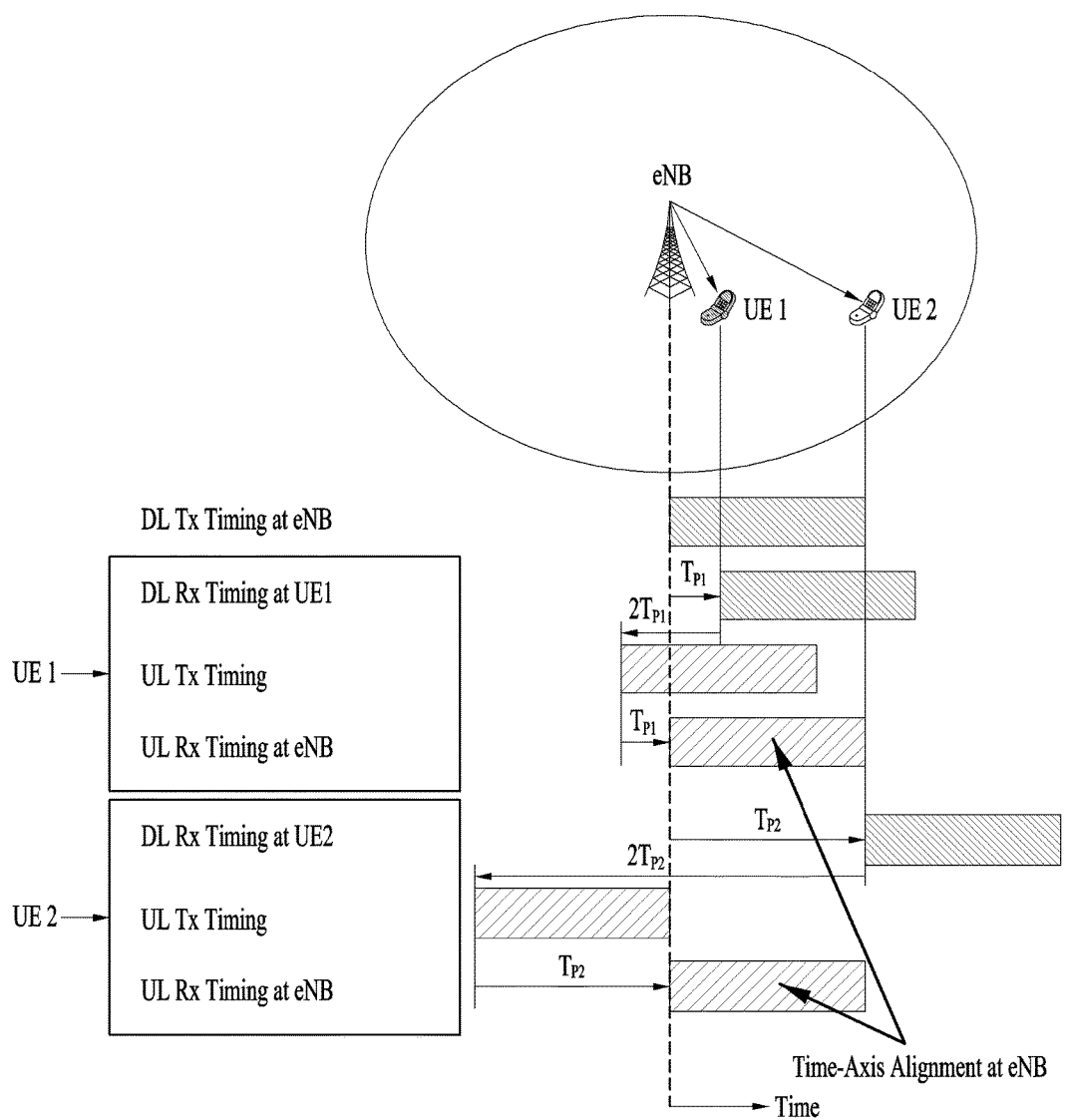

FIGS. 7 and 8 illustrate exemplary time-axis alignment between UL transmissions with TAs. Particularly, FIGS. 7 and 8 are based on the assumption that UE1 is relatively near to an eNB and thus has a short propagation delay, TP1, and UE2 is remote from the eNB and thus has a long propagation delay, TP2 (TP1<TP2).

It may be noted from FIG. 7 that without TAs, UL transmissions are not aligned along the time axis at the eNB. On the contrary, it may be noted from FIG. 8 that since UE1 and UE2 perform UL transmissions with TAs, the UL signals are aligned along the time axis from the viewpoint of the eNB.

As illustrated in FIG. 8, the propagation delay of a UE is a DL reception timing of the UE and expressed as a Round Trip Delay (RTD), for a TA. Thus, the TA is the double of the propagation delay. Therefore, as a UE is farther from the eNB and thus has a longer propagation delay, the UE should perform UL transmission earlier, for time-axis alignment of the UL transmission at the eNB.

The TA procedure is divided into an initial TA procedure and a TA update procedure, which will be described in detail.

1) Initial TA Procedure

In the LTE system, a UE acquires initial receiver synchronization with DL transmission from an eNB, and performs TA using a random access procedure. That is, the eNB measures a UL timing using a random access preamble received from the UE, and transmits a random access response message including an 11-bit initial TA Command (TAC) to the UE.

2) TA Update Procedure

Figure 9:
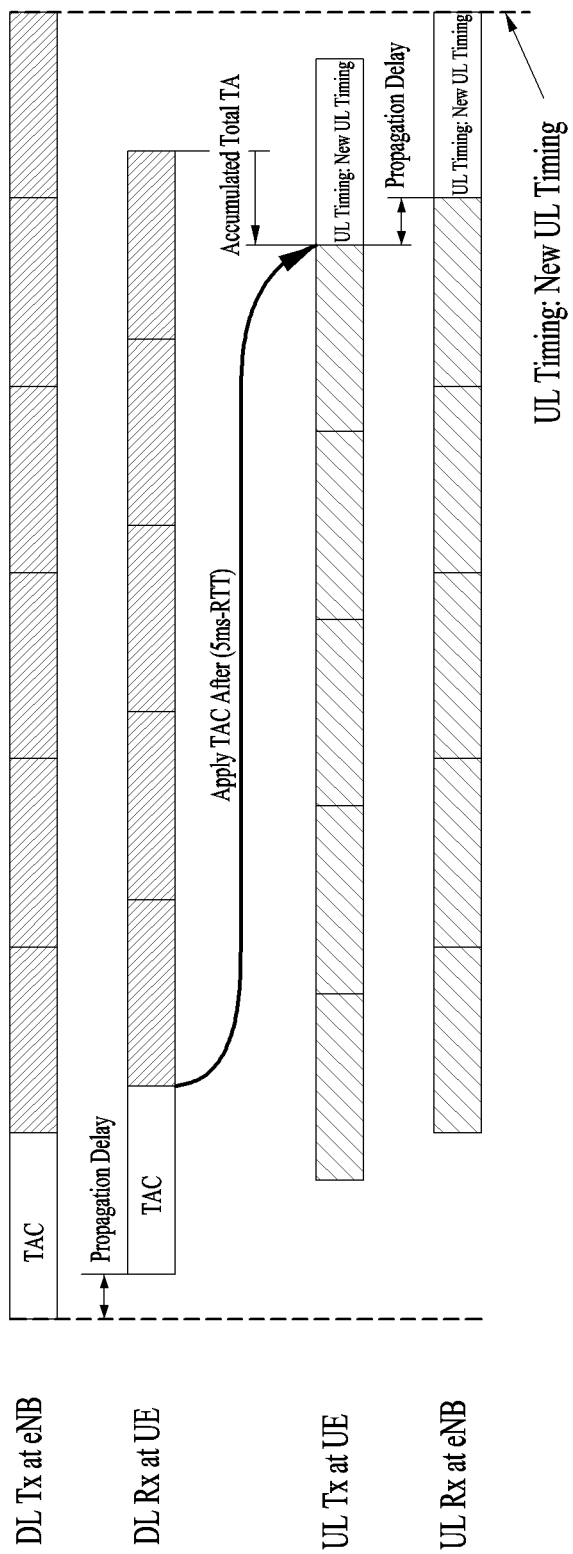
FIG. 9 illustrates an exemplary TA update procedure.

FIG. 9 illustrates an exemplary TA update procedure.

In the TA update procedure, the eNB may use all available UL Reference Signals (UL RSs). The UL RSs may include Sounding Reference Signal (SRS), Channel Quality Indicator (CQI), ACK/NACK, and so on. In general, a timing estimation accuracy increases with use of a UL RS corresponding to a wide band and thus the SRS may be preferred. However, a UE at a cell edge may have limitations in using the SRS due to limited transmission power.

Figure 10:
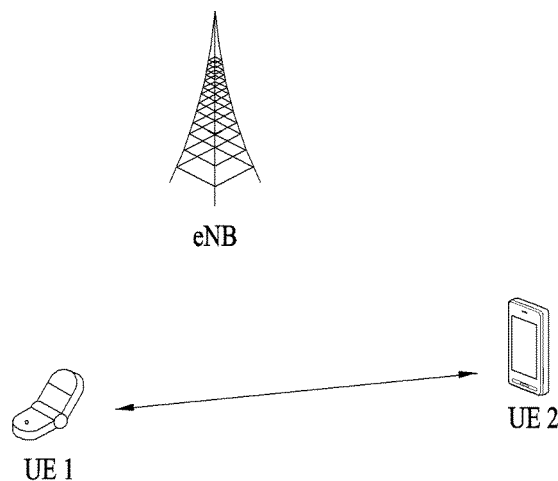
FIG. 10 is a conceptual view of Device-to-Device (D2D) communication.

FIG. 10 is a conceptual view of Device-to-Device (D2D) communication.

Referring to FIG. 10, an eNB may transmit a scheduling message indicating D2D transmission/reception, in D2D communication, that is, UE-to-UE communication. UEs participating in the D2D communication receive the D2D scheduling message from the eNB and perform the D2D transmission/reception indicated by the D2D scheduling message. Although a UE refers to a user terminal, if a network entity such as an eNB transmits and receives signals in a UE-to-UE communication scheme, the network entity may be regarded as a kind of UE. Hereinbelow, a direct link between UEs is referred to as a D2D link, and a link between a UE and an eNB is referred to as an NU link.

Preferably, a D2D signal is transmitted and received in UL resources. This is advantageous in that interference is mitigated by maintaining UL resources as transmission resources of a UE. D2D signals transmitted by a UE are classified largely into two types. One of the two types is a signal to which a conventional UL TA is applied and for which transmission resources are determined mainly by a direct indication of an eNB, and the other type is a signal which is transmitted without using the conventional UL TA, for example, a signal transmitted using a specific fixed TA value. Especially, the latter type is a signal for which transmission resources are determined mainly by an autonomous decision of a UE, not a direct indication of an eNB, or a signal for which although a direct indication of an eNB is applied, a UL TA is not used for active multiplexing with other signals to which a direct indication of the eNB is not applied.

If a TA is used for a D2D signal, the D2D signal does not overlap with a legacy UL signal because the D2D signal and the legacy UL signal have the same subframe boundary. On the other hand, if a TA is not used for a D2D signal, the D2D signal has a different subframe boundary from a legacy UL signal. As a result, the D2D signal transmission may overlap with the legacy UL signal transmission at some time points, which will be described with reference to a drawing.

Figure 11:
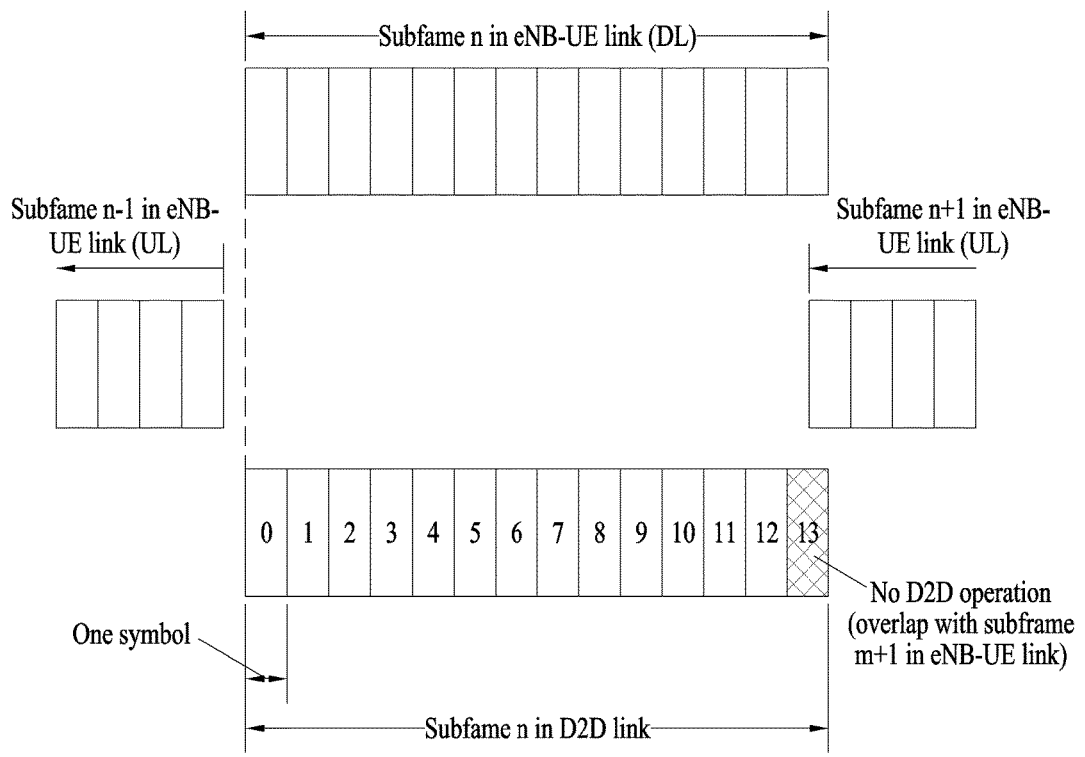
FIG. 11 illustrates an exemplary problem encountered with non-use of a TA for a D2D signal.

FIG. 11 illustrates an exemplary problem encountered with non-use of a TA for a D2D signal.

Referring to FIG. 11, if a D2D signal is transmitted with TA=0 in subframe #n, the D2D signal overlaps with a UL signal transmitted in subframe #(n+1) with TA>0. In this case, to ensure the UL signal transmission in subframe #(n+1), the last symbol of subframe #n may be configured as a gap, so that the D2D transmission may not occur.

Meanwhile, as a UE which transmits a D2D signal with a TA moves, the distance between the UE and an eNB is changed, and thus the UE should be able to update the TA and apply the updated TA to D2D signal transmission. In general, the UE considers that a TA set by a TAC received once is stable during a predetermined time (e.g., a running time of a timeAlignmentTimer (TAT)). After the predetermined time elapses, the UE considers that the TA is unstable and does not perform transmission with the TA.

When the UE transmits a UL signal to the eNB, the eNB determines whether the UL signal is aligned with a UL subframe boundary set by the eNB, while receiving the UL signal. If the UL signal is not aligned with the UL subframe boundary, the eNB transmits an appropriate TAC to the UE. Since the duration of a time period over which the TA may be considered to be stable is also known to the eNB, the eNB may schedule the UE to transmit a UL signal before the time period elapses, and update the TA to an appropriate value based on the received UL signal, so that the TA may be maintained stable.

However, because a D2D signal transmitted by the UE is directed to another UE, not the eNB, reception of the D2D signal for TA update at the eNB is basically unnecessary. If the eNB does not receive any D2D signal, a UE having no UL signal to be transmitted to the eNB wants to continuously transmit a D2D signal with a TA via a D2D link, but does not receive a new TAC from the eNB until expiration of a time period during which the TA may be considered to be stable. Consequently, the UE has the unstable TA, thus not transmitting a D2D signal.

Accordingly, while the UE may resume the D2D transmission by starting an RACH procedure and thus acquiring a new TA from the eNB, the UE should discontinue the D2D transmission until completion of the RACH procedure. If the UE should transmit a D2D signal urgently, a time delay involved in the RACH procedure may cause a problem.

Hereinbelow, a description will be given of embodiments of the present invention in which even though a UE does not have a signal to be transmitted directly to an eNB during continuous transmission of a D2D signal with a TA, the UE may appropriately update the TA.

Method 1)

Before a current TA used by the UE becomes unstable, the eNB may attempt to receive a D2D signal from the UE and transmit a new TAC to the UE based on the received D2D signal so that the UE may update the TA. If the UE continues D2D transmission, Method 1) is effective, and otherwise, it is difficult to perform Method 1).

Method 2)

It may be regulated that before the current TA becomes unstable, the UE autonomously transmits a specific UL signal to the eNB. The specific UL signal may be, for example, a PRACH preamble by which an RACH procedure starts. If dedicated Scheduling Request (SR) resources have been assigned to the UE, the UE may transmit an SR signal so that the eNB may determine the stability of the current TA and perform necessary TA update. Obviously, if there is no problem with the stability of the current TA, it is possible to lengthen a TAT.

Method 2) is advantageous in that even in the absence of D2D traffic, a UE is allowed to immediately transmit a signal by maintaining UL synchronization with an eNB. Consequently, Method 2 may be interpreted as reporting of imminent instability of a TA to a network by a UE. Since the eNB has only to update a TA, a UL signal transmitted before the TA becomes unstable may be distinguished from a UL signal for which resources are requested due to generation of actual UL traffic. For this purpose, the eNB may allocate the UE a PRACH preamble or SR resources other than a PRACH preamble or SR resources used for requesting UL resources, so that the UE may transmit the PRACH preamble or use the SR resources to transmit an SR, before the TA becomes unstable.

Method 2) may be applied only to a UE that performs D2D transmission. The D2D transmission may be confined to transmission of a D2D signal with a TA, and a D2D operation with no TA applied to all necessary D2D transmissions may be excluded from the D2D transmission. For example, only when the UE notifies the eNB of its intention of D2D transmission, the UE may autonomously perform Method 2).

Nonetheless, Method 2) may also be applied to a UE that does not perform a D2D operation. Specifically, if a specific UE should transmit or receive a very urgent signal to or from the eNB, the UE should maintain a stable TA. To receive a signal from the eNB, the UE naturally needs a stable TA. Also, when the UE receives a signal from the eNB, the UE should transmit an HARQ-ACK to the eNB in response to the received signal and thus needs a stable TA.

Although it is preferred to apply Method 2) to a UE requiring urgent communication, Method 2) is merely a process of consuming battery power by transmitting an unnecessary signal from the viewpoint of a general UE. Therefore, for a UE equipped with a high-capacity battery, or a UE requiring fast communication, which is placed in, for example, a vehicle and thus has almost no problem with power consumption, Method 2) may be effective. Therefore, the eNB should be able to identify a UE which is preferable for Method 2). For this purpose, each UE may notify the eNB whether it is to urgently transmit a signal to the eNB and/or a D2D signal, and/or it needs Method 1) or Method 2). The UE may transmit the notification during signaling its capabilities to the eNB.

Upon receipt of such a notification from a UE, if the UE wants to perform urgent communication, for example, vehicle-to-vehicle communication, the eNB may configure Method 2) for the UE. Especially, the UE may transmit the notification by indicating its power state to the eNB. For example, if the UE is placed in a vehicle and thus has sufficient power stored in its battery, the UE may indicate this power state to the eNB, so that it may perform signal transmission and reception rapidly in Method 2) without any power consumption problem. Obviously, it is also possible for the eNB to configure the UE not to use Method 2) later.

Meanwhile, if the UE transmits an SR or a PRACH preamble excessively in performing Method 2), the transmission may cause unnecessary interference to the network. Accordingly, even though the UE intends to maintain a TA stable, the UE should be able to control the frequency of signal transmissions appropriately. In one method of controlling the frequency of signal transmissions, a timer similar to a TAT used to determine whether a TA is stable may be used.

Specifically, the UE may activate a predetermined timer, and upon expiration of the timer, transmit an SR or a PRACH preamble to the eNB, so that the eNB may transmit a TAC to the UE. If the SR or PRACH preamble is transmitted or a new TAC is received, the timer may restart. Also, the timer may restart, when a UL signal or even a D2D signal with a TA is transmitted. However, it is to be assumed that the eNB may update a TA based on any UL signal or even a D2D signal with a TA. The timer may be different from the timer related to the stability of a TA, TAT, and generally has a smaller value than the TAT.

If the eNB does not transmit a new TAC in spite of a UL signal transmitted by the UE upon expiration of the timer of the present invention, it may occur that if the TAT, the timer related to the stability of a TA expires, the UE may determine the TA to be unstable. Therefore, it may be regulated that the UE is allowed to use Method 2) only within a predetermined time before expiration of the TAT (i.e., only during a time period over which the TAT has a predetermined value or larger and does not reach a timeout value), and not to use Method 2) a predetermined time before expiration of the TAT (i.e., a time period over which the TAT has the predetermined value or less). In this case, it may be proposed that the number of reports indicating that a TA will be unstable soon, transmitted to the eNB by the UE in Method 2) is limited to N or less.

Meanwhile, if a transmitting UE transmits a D2D data signal with a TA, a receiving UE needs to have knowledge of the TA used by the transmitting UE. Therefore, the receiving UE may detect a signal corresponding to a timing reference of the transmitting UE and set the time point as a reference for a reception timing. The signal corresponding to the timing reference of the transmitting UE may be a synchronization signal of a cell with which the transmitting UE is synchronized, or a D2D synchronization signal transmitted directly by the transmitting UE.

The transmitting UE may transmit a D2D data signal at a time point to which its TA is applied according to the timing reference. For the purpose, the transmitting UE may transmit some D2D signal, particularly a signal carrying various types of control information (referred to as a Scheduling Assignment (SA)) without a TA. That is, the receiving UE receives the SA without the TA and determines the time position of a data signal to be transmitted later, based on a TA set in the SA. The SA functions to indicate the position of time and frequency resources used for the D2D data as well as the TA. In general, to reduce the overhead of a control signal, an SA is transmitted less often than D2D data. That is, one SA transmission delivers control information about a plurality of D2D data transmissions, which means that a TA included in one SA is applied to a plurality of D2D data transmissions.

If the transmitting UE receives a new TAC from the eNB and updates a TA under the SA and D2D data structure, the transmitting UE should determine when to update the TA for D2D data. Especially, when the transmitting UE transmits an SA once and receives a new TAC before transmitting the next SA, a TA update time may be an issue. This is because the receiving UE has no way to know the updated TA of the transmitting UE before receiving the next SA. In this situation, an operation method of the transmitting UE will be described below in detail. Hereinbelow, immediate TA update means that a UE receives a TAC and performs transmission by immediately applying an updated TA shortly after a predetermined time taken to process the TAC.

Method A) Method of Deferring Update of Every TA to Next SA Transmission Time

In Method A), even though a UE receives a new TAC at a specific time, the UE defers TA update at least until a transmission time of the next SA, without immediately applying the new TAC. Or the UE may update a TA after transmission of the last D2D data before the transmission time of the next SA. While transmission of the last D2D data may mean the end of D2D data transmission resources indicated by a previous SA, if there is no further D2D data traffic or only non-urgent traffic remains even before the end of the last resources indicated by the SA, it may be considered to be the end of the D2D data transmission.

In Method A), TA update may cover update of a TA applied to a general UL signal transmitted to an eNB as well as a TA applied to D2D data. Also, since it is possible for a UE to maintain a reception timing constant by continuously applying a TA included in one SA transmission to all D2D data transmissions to which the SA is applied, and the same TA is applied to D2D data and a UL signal, there is no overlap between subframes.

Method B) Method of Immediately Updating TA for UL Signal Directed to eNB, With Update of TA for D2D Data Deferred In Method B), an updated TA is immediately applied to a UL signal directed to an eNB, as is done conventionally, whereas application of an updated TA to D2D data is deferred as in Method A) in order to allow a receiving UE to maintain a reception timing constant. Because the latest TA is applied to a UL signal directed to the eNB by TA update, and a TA is not updated for D2D data as far as the receiving UE assumes a TA already transmitted by an SA, optimum TA updates are provided to both the eNB and the receiving D2D UE. However, since different TAs may be temporarily applied to the D2D data and the UL signal for the eNB, a problem such as subframe overlap described with reference to FIG. 11 may occur.

However, if the difference between the TAs applied to the two signals is equal to or less than a predetermined value, the transmitting UE may autonomously solve the problem by use of a gap positioned at the end of a D2D subframe. For example, if an old TA applied to D2D data and a new TA, X applied to a UL signal directed to the eNB satisfy the condition that $a \leq X \leq b$, the UE applies the TAs to the signals, separately. On the other hand, if the new TA does not satisfy the condition that $a \leq X \leq b$, the UE may discontinue one of the two transmissions, preferably the D2D signal transmission, to thereby prevent interference caused by a mismatch with D2D data signals or UL signals to the eNB, transmitted by other UEs. Herein, a and b represent, respectively the highest and lowest limits of the difference between two TAs that one UE may process at the same time. If both a and b are set to 0 in an extreme case, this implies that a D2D signal and a UL signal directed to the eNB may be transmitted only when the two TAs are equal.

Method C) Method of Immediately Updating TAs for D2D Data and UL Signal Directed to eNB According to Method C), the same TA is always applied to D2D data and a UL signal and thus a D2D subframe and a UL subframe match. However, if the TA is changed too much, a receiving UE may have a problem in operating based on the old TA. Therefore, only when the difference X between a TA indicated by the previous SA and an updated TA satisfies the condition that a≤X≤b, as in Method B), D2D data and a UL signal directed to the eNB may be transmitted.

If there is a limit imposed on the difference between a TA for D2D data and a TA for a UL signal directed to an eNB in Method B) and Method C), the eNB may transmit a TAC that makes the difference not exceed the limit.

For example, the eNB may transmit a TAC by transmitting an 11-bit absolute TA value in a Random Access Response (RAR) or by transmitting a correction value for an existing TA value using 6 bits of a MAC header. Considering that the latter method has limitations in TA update, if a TA is updated using 6 bits of a MAC header, the UE may operate normally even though different TAs are applied temporarily to D2D data and a UL signal directed to the eNB, as far as the UE is capable of accommodating a TA change by the 6-bit field.

On the other hand, if the 11-bit absolute TA value is transmitted by an RAR, a TA may be reset completely and very different TAs may be applied to D2D data and a UL signal directed to the eNB. Therefore, in the case where a TA is reset by Random Access (RA), the UE may cancel D2D data transmission in resources indicated by an existing SA. Accordingly, the receiving UE may not prepare for a case where a received signal is much outside the TA indicated by the existing SA.

Obviously, the above-described methods are not applied only to D2D data transmission. Rather, they may be applied in the same manner to a case where a TA is applied to a certain discovery signal.

The above operations for updating a TA and applying the updated TA to a D2D signal have been described from the viewpoint of a transmitting UE. Meanwhile, from the viewpoint of a receiving UE, once the UE receives a TA in one SA, the UE has no way to know a changed TA until receiving the next SA. Therefore, the receiving UE attempts to receive a D2D signal on the assumption that a TA received in an SA lasts until a transmission time of the next SA. Since this assumption is allowed, it is possible to skip the operation for determining the start of a D2D signal received from the transmitting UE in each D2D subframe by the receiving UE.

The above assumption that the receiving UE takes may be effective, especially to discovery for which D2D resources have a relatively long periodicity. For example, if it is assumed that a resource pool for a D2D signal appears every X ms and once the resource pool appears, it spans time resources of Y ms, X may be set to a value much larger than Y to reduce the resource overhead of the discovery signal. Accordingly, even though the transmitting UE needs TA update, if it attempts TA update only at a time point between two discovery resource pools, no TA update takes place within one discovery resource pool lasting Y ms. Also, the receiving UE may receive a D2D signal on the assumption that the same UE applies the same transmission time within at least one discovery resource pool.

Figure 12:
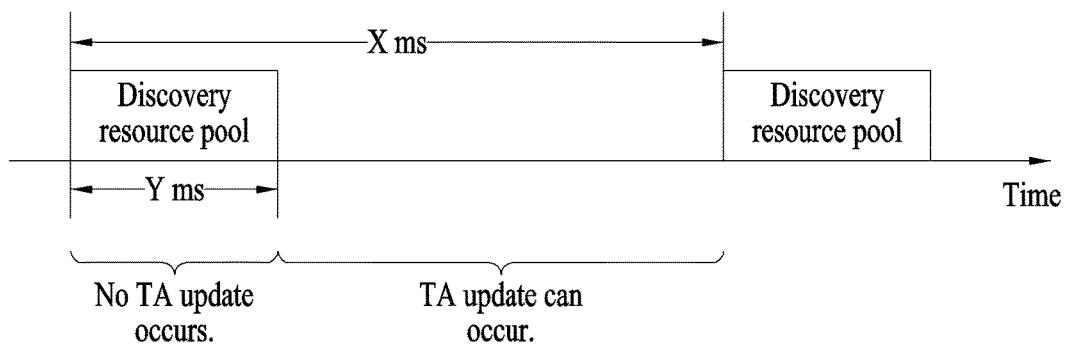
FIG. 12 illustrates exemplary TA control within a discovery resource pool according to an embodiment of the present invention.

FIG. 12 illustrates exemplary TA control within a discovery resource pool according to an embodiment of the present invention. Particularly in FIG. 12, a transmitting UE may assume that an eNB does not transmit a TAC leading to TA update within one discovery resource pool (i.e., the eNB transmits a TAC leading to TA update only at a time point outside the discovery resource pool).

Meanwhile, as described before, the eNB may transmit a D2D signal to a UE. In this case, it is obvious that a TAC to be applied to D2D data is 0. Therefore, a field corresponding to a TA in an SA transmitted by the eNB may be preset to a specific value such as 0, to thereby effectively reduce a channel coding rate applied to the SA.

Or an SA transmitted by the eNB may be configured with fewer bits by omitting TA information. To this end, the receiving UE should determine which SA has been transmitted by the eNB. This may be possible by setting a value used to mask the CRC of an SA or a seed value used to generate a DM-RS sequence and/or a scrambling sequence of the SA to a different value from a value for an SA transmitted by a general UE. Or an SA transmitted by the eNB may be identified using resources different from those of an SA transmitted by a UE in terms of time and/or frequency.

Figure 13:
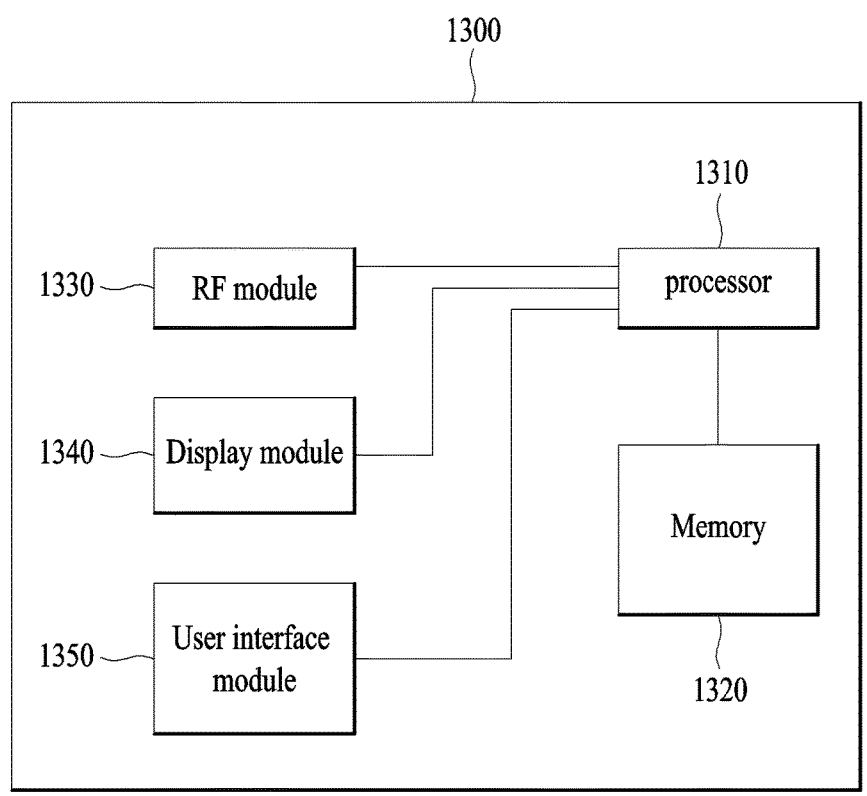
FIG. 13 is a block diagram of a communication apparatus according to the present invention.

FIG. 13 is a block diagram of a communication apparatus according to an embodiment of the present invention.

Referring to FIG. 13, a communication apparatus 1300 includes a processor 1310, an RF module 1330, a display module 1340, and a user interface module 1350.

The communication apparatus 1300 is shown as it is in FIG. 13, for the convenience of description, and some module may be omitted from the communication apparatus 1300. Further, a necessary module may be added to the communication apparatus 1300. Also, some module of the communication apparatus 1300 may be further divided. The processor 1310 is configured to perform operations according to the embodiments of the present invention, as described with reference to the drawings. Specifically, FIGS. 1 to 12 may be referred to for details of the processor 1310.

The memory 1320 is connected to the processor 1310, and stores an Operating System (OS), applications, program code, data, and so on. The RF module 1330 is connected to the processor 1310, and functions to upconvert a baseband signal to a radio signal or downconvert a radio signal to a baseband signal. For this purpose, the RF module 1330 performs analog conversion, amplification, filtering, and frequency upconversion or performs these processes reversely. The display module 1340 is connected to the processor 1310 and displays various types of information. The display module 1340 may use, but not limited to, a known element such as Liquid Crystal Display (LCD), Light Emitting Diode (LED), or Organic LED (OLED). The user interface module 1350 is connected to the processor 1310 and may be configured as a combination of known user interfaces such as a keypad and a touch screen.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the method and apparatus for controlling a TA for D2D communication in a wireless communication system have been described above in the context of a 3GPP LTE system, they are also applicable to various wireless communication systems other than the 3GPP LTE system.

The invention claimed is:

1. A method for transmitting a signal via a Device-to-Device (D2D) link by a first User Equipment (UE) in a wireless communication system, the method comprising:
setting an information related to a first timing advance (TA) value obtained based on a first TA command received from a Base Station (BS);
transmitting, to a second UE, the information related to the first TA value via a first D2D control channel; and
transmitting, to the second UE, a first D2D data channel related to the first D2D control channel by applying the first TA value to the first D2D data channel;
setting an information related to a second TA value updated based on the first TA value and a second TA command received from the BS;
transmitting, to the second UE, the information related to the second TA value via a second D2D control channel; and
transmitting, to the second UE, a second D2D data channel related to the second D2D control channel by applying the second TA value to the second D2D data channel,
wherein the first D2D control channel and the second D2D control channel carry a control information for a D2D communication, and
wherein the first D2D control channel and the second D2D control channel are transmitted without applying the first TA value and the second TA value.

2. The method according to claim 1, wherein an uplink signal for the BS is transmitted by applying the updated second TA value.

3. The method according to claim 1, wherein the first D2D data channel is transmitted based on the first TA value until the second D2D control channel is transmitted.

4. A User Equipment (UE) for conducting communication via a Device-to-Device (D2D) link in a wireless communication system, the UE comprising:
a transceiver configured to transmit and receive signals to and from another UE or a Base Station (BS); and
a processor configured to process the signals,
wherein the processor is further configured to:
set an information related to a first timing advance (TA) value obtained based on a first TA command received from the BS,
control the transceiver to transmit the information related to the first TA value via a first D2D control channel,
control the transceiver to transmit a first D2D data channel related to the first D2D control channel by applying the first TA value to the first D2D data channel,
set an information related to a second TA value updated based on the first TA value and a second TA command received from the BS,
control the transceiver to transmit the information related to the second TA value via a second D2D control channel, and
control the transceiver to transmit a second D2D data channel related to the second D2D control channel by applying the second TA value to the second D2D data channel,
wherein the first D2D control channel and the second D2D control channel carry a control information for a D2D communication, and
wherein the first D2D control channel and the second D2D control channel are transmitted without applying the first TA value and the second TA value.

5. The UE according to claim 4, wherein an uplink signal for the BS is transmitted by applying the updated second TA value.

6. The UE according to claim 4, wherein the first D2D data channel is transmitted based on the first TA value until the second D2D control channel is transmitted.

* * * * *